(12) United States Patent  
Temple (10) Patent No.: US 7,926,534 B2
(45) Date of Patent: Apr. 19, 2011

(54) PIPE WELDER FOR SIMULTANEOUSLY FUSING A PLURALITY OF POLYETHYLENE PIPES

(75) Inventor: William James Temple, Fort Collins, CO (US)

(73) Assignee: Fast Fusion, LLC, Palisade, CO (US)

( * ) Notice: Subject to any disclaimer, the term of this patent is extended or adjusted under 35 U.S.C. 154(b) by 0 days.

(21) Appl. No.: 11/252,501

(22) Filed: Oct. 18, 2005

(65) Prior Publication Data

US 2006/0048897 A1   Mar. 9, 2006

Related U.S. Application Data

(62) Division of application No. 10/403,272, filed on Mar. 28, 2003, now abandoned.

(60) Provisional application No. 60/369,067, filed on Mar. 28, 2002.

(51) Int. Cl.
*B29C 65/18*    (2006.01)
*B29C 65/30*    (2006.01)
*B29C 65/74*    (2006.01)
*B29C 65/78*    (2006.01)

(52) U.S. Cl. .............. 156/379.8; 156/423; 156/510; 156/516; 156/517; 138/120; 138/155

(58) Field of Classification Search .............. 156/517, 156/120; 138/155
See application file for complete search history.

(56) References Cited

U.S. PATENT DOCUMENTS

| 3,552,265 | A | * | 1/1971 | Lucas ................... 409/145 |
| 3,793,119 | A | * | 2/1974 | Province ................ 156/499 |
| 4,674,926 | A |   | 6/1987 | Schroder et al. |
| 4,990,209 | A |   | 2/1991 | Rakes |
| 5,692,285 | A |   | 12/1997 | Weimer et al. |
| 5,725,724 | A |   | 3/1998 | Andrew et al. |
| 5,843,271 | A |   | 12/1998 | Andrew et al. |
| 6,021,832 | A |   | 2/2000 | McElroy, II et al. |
| 6,212,747 | B1 |   | 4/2001 | Porter et al. |
| 6,212,748 | B1 |   | 4/2001 | Porter et al. |

FOREIGN PATENT DOCUMENTS

| GB | 2134204 | * | 8/1984 |
| JP | 54-61271 A1 | | 5/1979 |
| JP | 07205302 A1 | | 8/1995 |
| JP | 10-685 | * | 1/1998 |
| JP | 11-248068 A1 | | 9/1999 |
| WO | WO 00/63002 | * | 10/2000 |
| ZA | 9807616 A1 | | 12/1999 |

* cited by examiner

*Primary Examiner* — Justin Fischer (74) *Attorney, Agent, or Firm* — Dinsmore & Shohl LLP; Monika J. Hussell (57) ABSTRACT

Disclosed are a device and method for the simultaneous fusion of multiple plastic pipe sections. A plurality of pipe sections may be rigidly held, faced off, heated, and joined at the same time using a single piece of equipment. The inventive process allows increased throughput of the fusion process without significant additional costs.

7 Claims, 7 Drawing Sheets

PIPE WELDER FOR SIMULTANEOUSLY FUSING A PLURALITY OF POLYETHYLENE PIPES

CROSS REFERENCE TO RELATED APPLICATIONS

The present application is a divisional of U.S. application Ser. No. 10/403,272, filed Mar. 28, 2003, now abandoned which is based upon and claims the benefit of U.S. Provisional Patent Application Ser. No. 60/369,067 by William J. Temple entitled "Multiple Pipe Welding" filed Mar. 28, 2002, the entire contents of which are hereby specifically incorporated by reference for all they disclose and teach.

BACKGROUND OF THE INVENTION a. Field of the Invention

The present invention pertains generally to the fusion of plastic pipe and specifically to the simultaneous fusion of multiple sections of plastic pipe.

b. Description of the Background

Polyethylene pipe is used commercially for the construction of pipelines for various applications such as natural gas, water, sewer, and other materials. In addition, polyethylene pipe may be used as conduit to protect transmission cables such as high voltage electricity, fiber optic telecommunication, telephone, cable television, and other signal cables.

Polyethylene pipe is typically joined through a process called fusion welding, the most common joint being a butt joint. A butt joint is formed by holding the two sections of pipe rigidly, performing a facing operation to square the ends of the pipes and prepare the pipes for welding, then heating the prepared faces of the pipes on a hot plate to the melting point, removing the heating element, and forcing the two melted faces together. The resulting joint may be cooled before being subjected to any handling forces. The result is a fused joint that is as strong or stronger than the parent material and is very reliable.

U.S. Pat. No. 4,990,209 issued to George Rakes entitled "Self Propelled Fusion Machine" (Rakes) is a machine adapted to perform butt joints on polyethylene pipe as described above. Rakes is incorporated herein by reference for all that it discloses and teaches. The Rakes machine performs the sequence of butt fusing in a semi automated fashion, with provisions for easily loading and unloading the pipe as it is welded. Additionally, the Rakes device performs the butt fusion process in an enclosed environment, adding to the consistency and throughput of the machine in all types of weather. After fusing a section of pipe, the Rakes machine advances and assembles another section.

The throughput of machines such as Rakes is limited to performing one weld at a time on a single pipe. In some applications, however, two or more pipelines may be run parallel to each other in the same ditch. In such applications, machines such as Rakes' machine must make multiple passes to assemble the necessary pipe for a particular installation.

Other machines are not as mobile as the Rakes machine. With machines that are not mobile, it may be common for the constructor to assemble a section of pipe to the pipeline, then drag the entire length of assembled pipe to advance the pipe for assembly. In such cases, the machine is fixed and the pipeline is advanced. The limiting factor in throughput is the fact that the welds can only be performed one at a time.

It would therefore be advantageous to provide a device and method of fusing more than one section of pipe at a time. It would be further advantageous if the equipment required for performing multiple welds were simple and easy to change over to different sized pipes.

SUMMARY OF THE INVENTION

The present invention overcomes the disadvantages and limitations of the prior art by providing a device and method for clamping and holding several pipe sections for simultaneous fusion. The pipes may be held in an adapter that may have several cut outs to fuse pipes of different diameters simultaneously. The adapter may fit into existing equipment.

The present invention may therefore comprise a method of simultaneously butt welding a plurality of plastic pipe sections comprising: fixturing a first pipe and a second pipe into a first fixture; fixturing a third pipe and a fourth pipe into a second fixture such that the axis of the first pipe is substantially coaxial with the axis of the third pipe and the axis of the second pipe is substantially coaxial with the axis of the fourth pipe; cutting the face of the first pipe and the face of the second pipe simultaneously with a first cutting device; cutting the face of the third pipe and the face of the fourth pipe simultaneously with a second cutting device; heating the cut ends of the first pipe, the second pipe, the third pipe, and the fourth pipe simultaneously; and forcing the ends of the pipes together to create a fusion weld between the first pipe and the third pipe and a fusion weld between the second pipe and the fourth pipe.

The present invention may further comprise a pipe fusion machine comprising: a first clamping mechanism, the first clamping mechanism being adapted to hold a first plurality of pipe sections simultaneously; a second clamping mechanism, the second clamping mechanism being adapted to hold a second plurality of pipe sections simultaneously and further being adapted so that the individual axis of each pipe being held in the first clamping mechanism is substantially coaxial with the individual axis of one other pipe being held in the second clamping mechanism; and a fusing mechanism for fusing sections of pipe to form a pipeline.

The advantages of the present invention are that multiple fusion operations may be accomplished in the same time as a single fusion operation. In some instances, the inventive device may be installed into an existing fusion machine with very little changeover time. Multiple fusion welds may increase productivity substantially, especially when the fusion machine is being used to create a plurality of pipelines that may be buried in the same ditch.

DETAILED DESCRIPTION OF THE INVENTION

Figure 1:
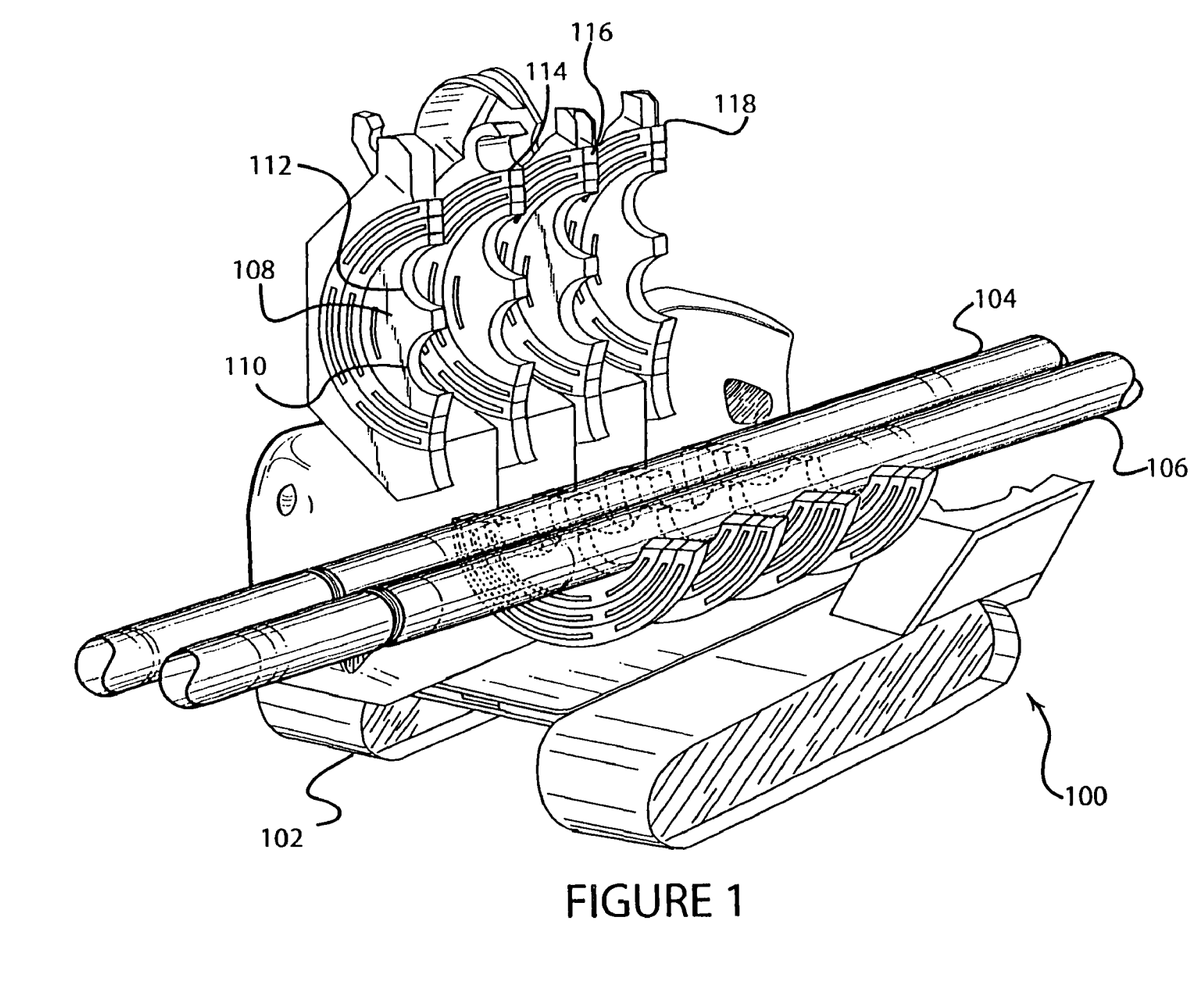
FIG. 1 is an illustration of an embodiment of the present invention wherein a pipe fusion machine is capable of welding two pipes simultaneously.

FIG. 1 illustrates an embodiment 100 of the present invention wherein a pipe fusion machine 102 is capable of welding two pipes simultaneously. The pipes 104 and 106 are shown straddling the machine 102 as the machine 102 traverses to the next welding location. The clamping mechanism 108 has two recesses 110 and 112 for receiving the pipe sections 104 and 106, respectively. Additional clamping mechanisms 114, 116, and 118 are similarly equipped. The machine 102 may be a McElroy TrackStar 500 fusion machine.

Figure 2:
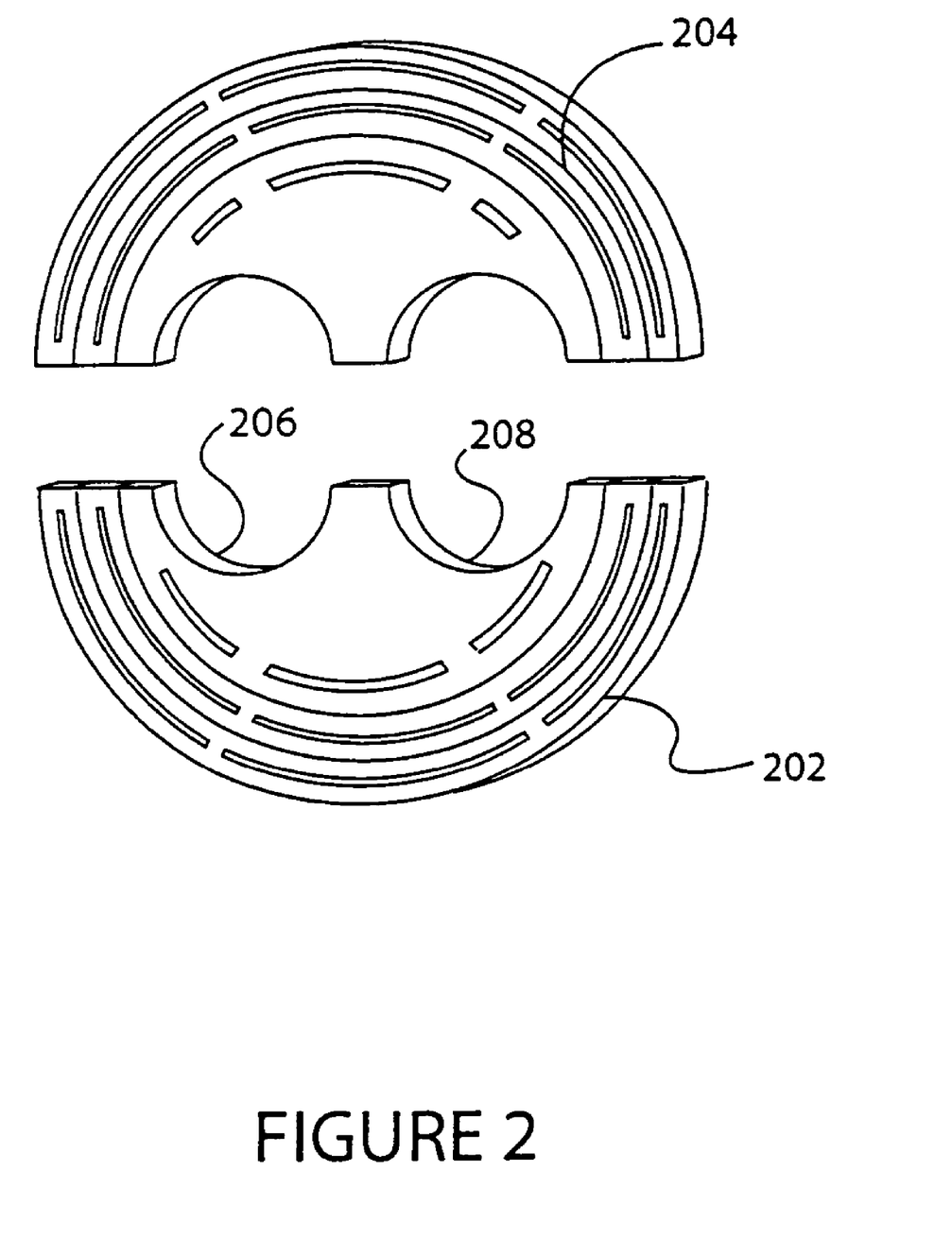
FIG. 2 is an illustration of sections of a clamping apparatus for the present invention.

FIG. 2 illustrates the sections 202 and 204 of a clamping apparatus for the present invention. The section 202 has recesses 206 and 208 for receiving two sections of pipe. The recesses 206 and 208 may be slightly undersized from the normal diameter of the pipe such that the recesses 206 and 208 grip the pipe sufficiently for the fusion process explained hereinafter.

The sections 202 and 204 may be inserts that may be changed out for various sizes of pipe. In some embodiments, the sections 202 and 204 may have more than two recesses similar to recess 206 for accommodating more than two sections of pipe simultaneously. In this specification, those skilled in the arts will appreciate that reference to the welding of two pipe sections simultaneously shall be construed to apply to the welding of any number of pipe sections simultaneously.

In some embodiments, the recesses 206 and 208 may be adapted for the same size pipe or for different size pipe. For example, a large pipe and a small pipe might be joined simultaneously for applications when a water line and a gas line are required in the same ditch.

In some fusion machines, the sections 202 and 204 may be quickly exchanged with sections similarly designed to fuse a single larger diameter pipe section. In such cases, the sections 202 and 204 may be adapted to various diameters and sizes without large tooling expenses.

Figure 3A:
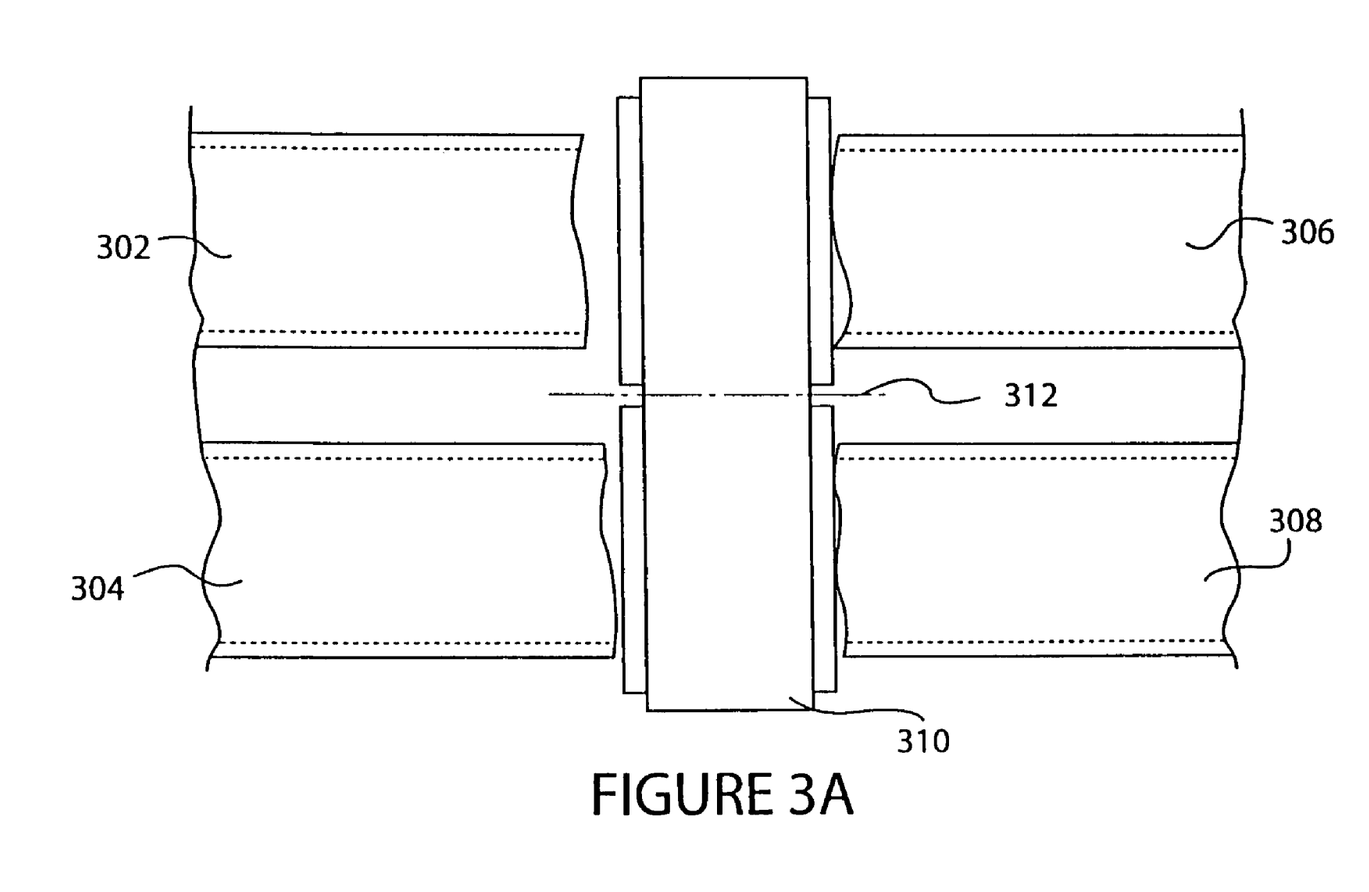
FIG. 3A is a planar view of four pipe sections as installed in a clamping mechanism similar to that of FIG. 2.

FIG. 3A illustrates a planar view of pipe sections 302, 304, 306, and 308. A facing tool 310 is shown beginning to face off the respective pipe sections. Prior to this process, the sections of pipe 302 and 304 are secured in a clamping mechanism and move together as one unit. Sections 306 and 308 are similarly secured in a clamping mechanism together and move as one unit. The facing tool 310 is a large cutter that rotates about the centerline 312. Several cutting blades may remove uneven edges and otherwise prepare the pipe sections 302, 304, 306, and 308 for fusion. During the cutting process, the sections of pipe 302 and 304 may be pushed toward the sections of pipe 306 and 308. As the cutting process continues, the pipe sections proceed against the face of the cutter 310 until the pipe sections are square.

Figure 3B:
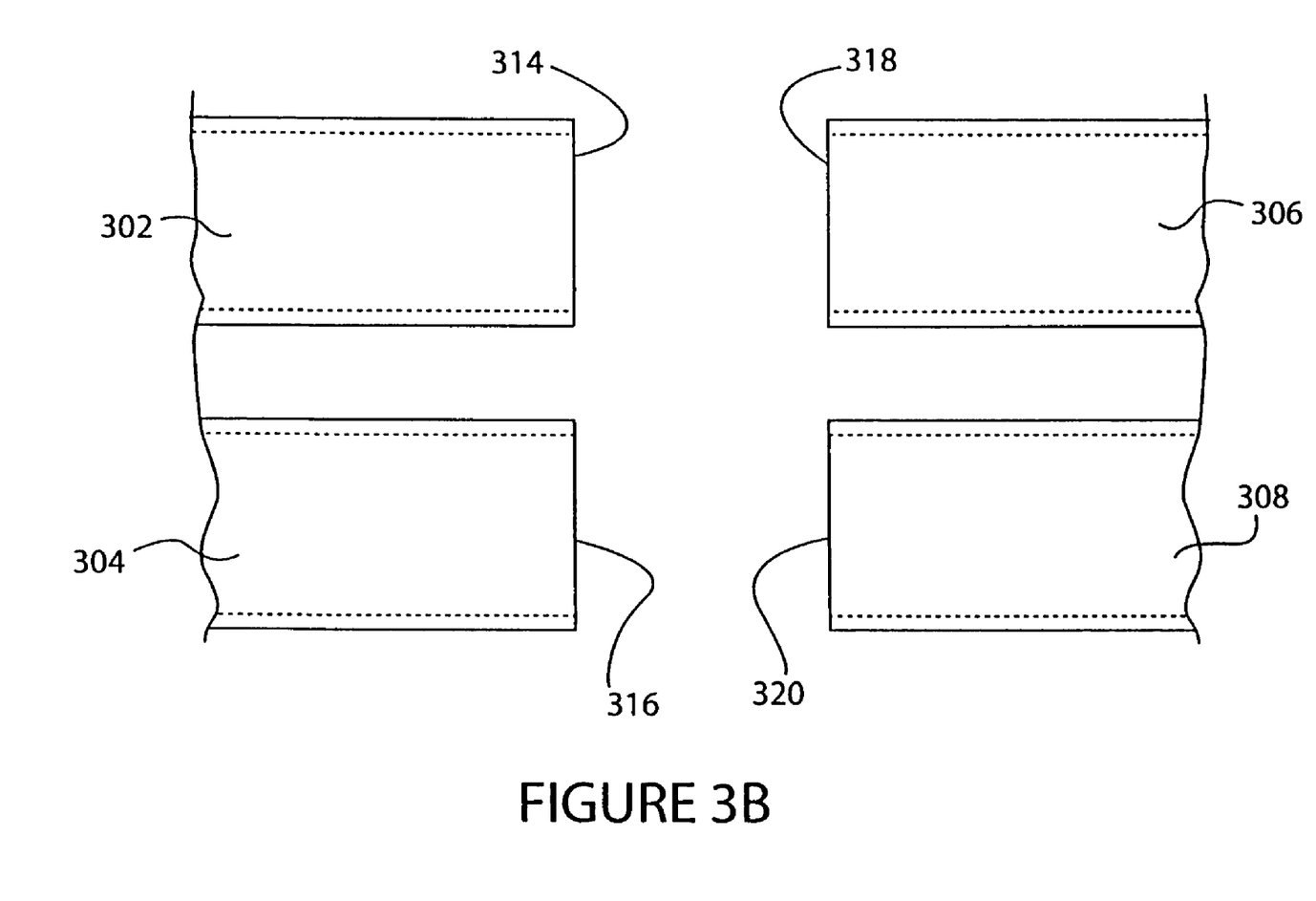
FIG. 3B is a planar view of the pipe sections of FIG. 3A after the facing operation illustrated in FIG. 3A has been completed.

FIG. 3B illustrates a planar view of pipe sections 302, 304, 306, and 308 after the facing operation illustrated in FIG. 3A has been completed. The inside faces 314, 316, 318, and 320 are square and flat. Further, faces 314 and 316 are substantially coplanar as are faces 318 and 320.

Figure 3C:
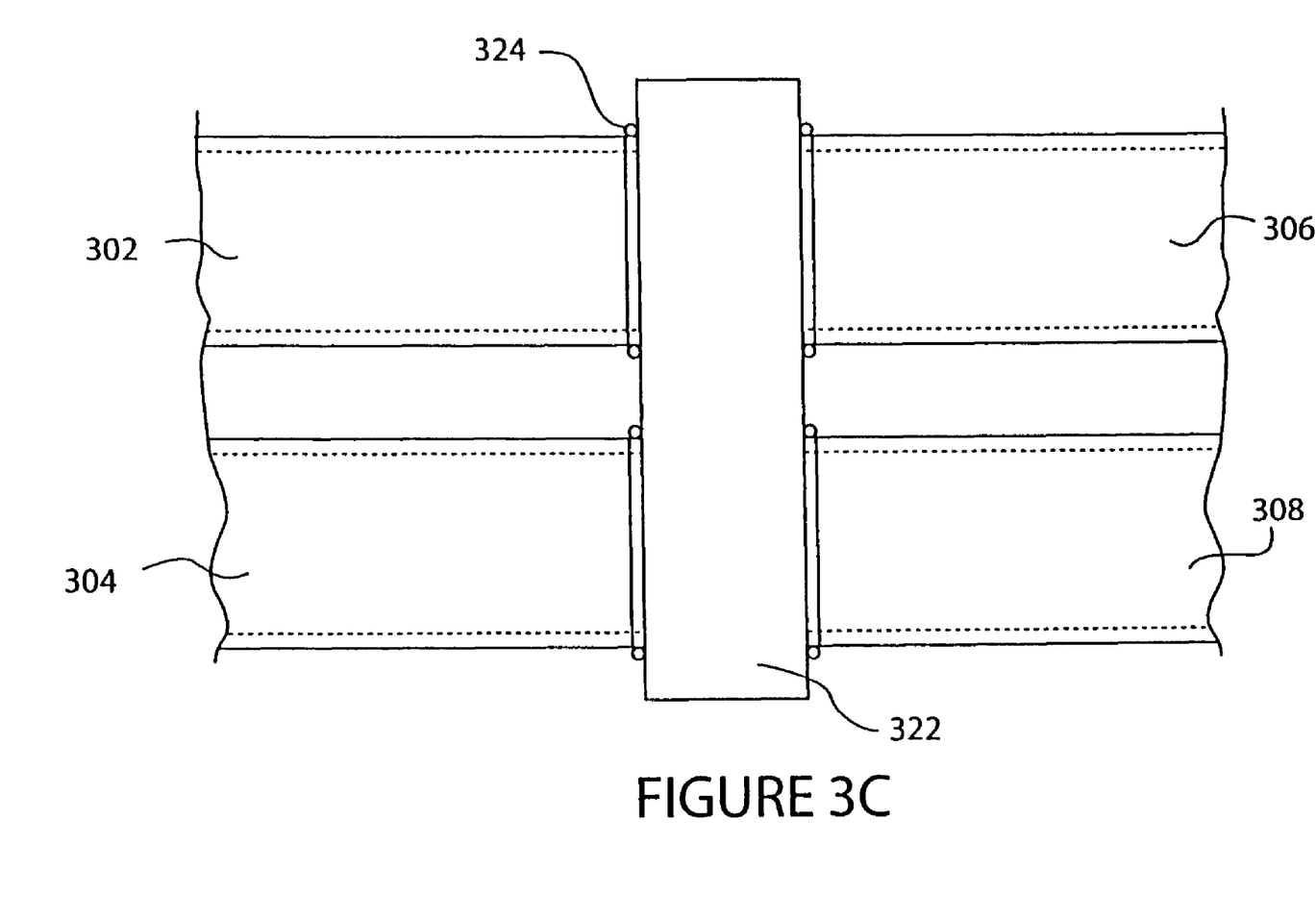
FIG. 3C is a planar view of the pipe sections of FIG. 3B wherein a heating plate is inserted to melt the ends of the pipe sections.

FIG. 3C illustrates a planar view of pipe sections 302, 304, 306, and 308 from FIG. 3B wherein a heating plate 322 is inserted. The various pipe sections are forced against the heating plate 322 during the heating process. During the heating process, the ends of the pipes are heated until the melting point, forming a bead 324 against the hot plate 322.

Figure 3D:
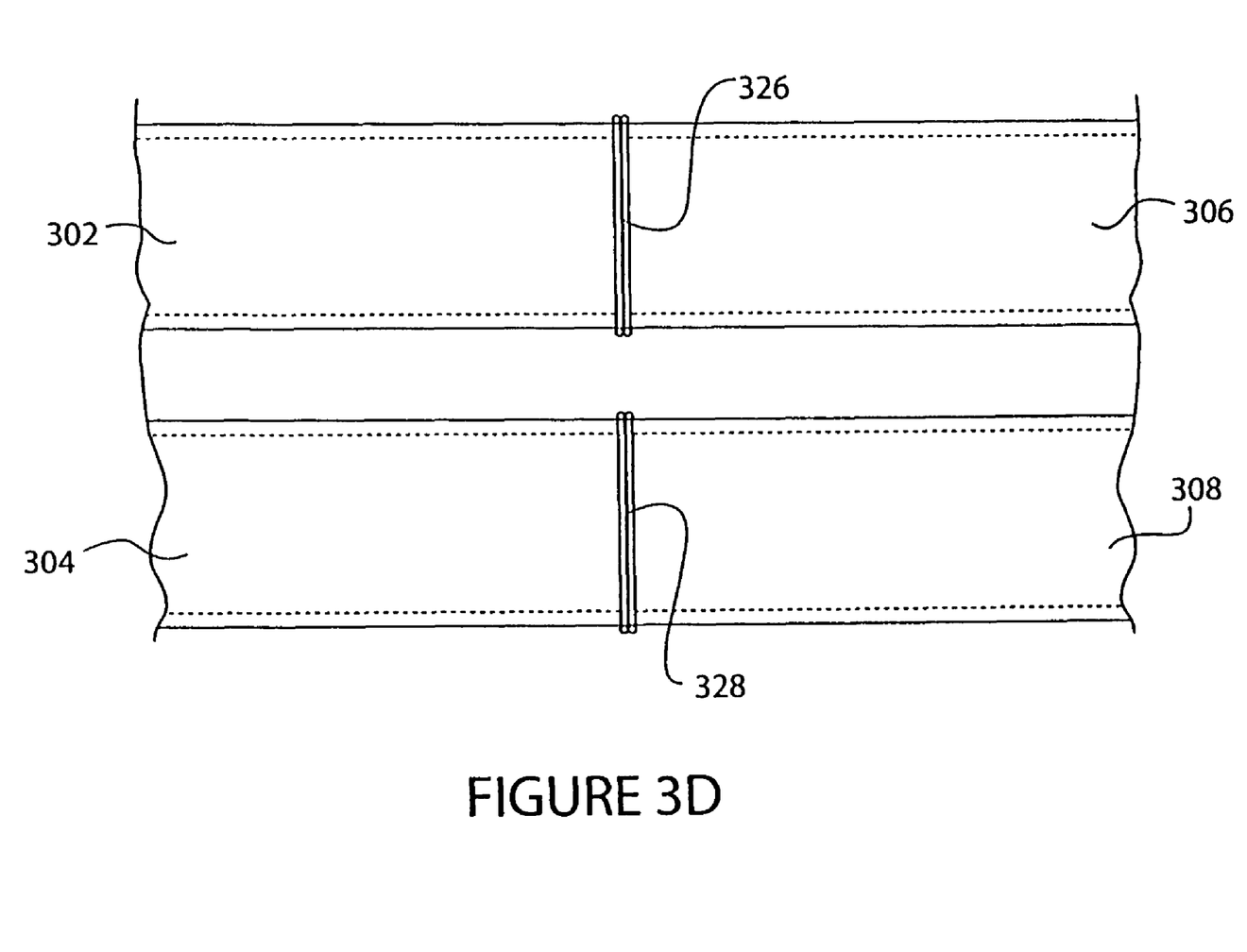
FIG. 3D is a planar view of the pipe sections of FIG. 3C wherein the hot plate has been removed and the sections of pipe have been forced together to form two joints.

FIG. 3D illustrates a planar view of pipe sections 302, 304, 306, and 308 of FIG. 3C wherein the hot plate 322 has been removed and the sections of pipe 302, 304, 306, and 308 have been forced together to form two joints 326 and 328. At this point in the process, the joints 326 and 328 may be cooled prior to handling the welded pipes. The welded joints may be capable of very high pressure and be very durable.

Figure 4:
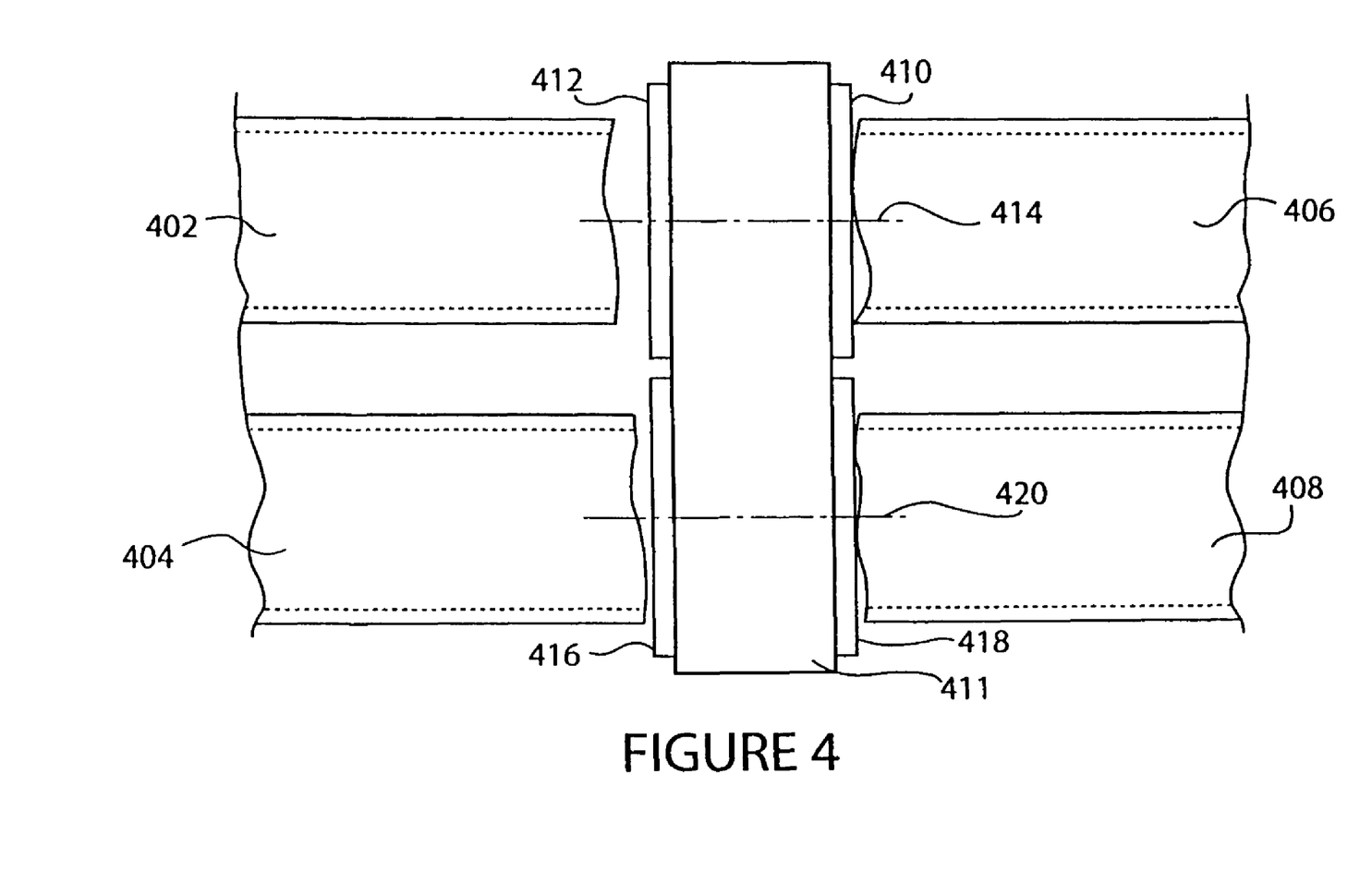
FIG. 4 is a planar view of the another embodiment of the facing operation of FIG. 3C wherein the facing operation is performed by four cutting heads instead of two.

FIG. 4 illustrates an embodiment 400 of the present invention wherein the facing operation, illustrated in FIG. 3C, is performed by four cutting heads instead of two. The pipes 402, 404, 406, and 408 are held prior to facing. The facing apparatus comprises a facing tool 411 comprising facing cutters 410 and 412 rotating about centerline 414 and facing cutters 416 and 418 rotating about centerline 420. The embodiment 400 has the advantage that the facing cutters rotate approximately along the centerline of the respective pipes, which may eliminate or minimize some chatter or flexing of the pipe during facing.

The results of the inventive process are to join two pipe joints that are fabricated in the same time required for a single joint. Such a process is extremely useful when two or more pipes are being laid in a single ditch. In applications where a pipeline might be assembled at a central point and be pulled in long sections to their installation point, the inventive process allows twice as many pipe sections to be assembled in the same time as a single pipe section. It would be appreciated by those skilled in the art that the inventive process may apply to the simultaneous welding of more than two pipes. For example, three, four, or more pipes may be welded using the inventive process without violating the spirit or intent of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A pipe fusion machine for fusing a first plurality of pipe sections to a second plurality of pipe sections, said machine comprising:
   a self-propelled frame;
   a plurality of clamping mechanisms, each mechanism comprising two sections, wherein each said section comprises one recess for receiving an insert, said clamping mechanism being supported by said self-propelled frame;
   a plurality of semi-circular inserts, each insert having a plurality of semi-circular recesses, each insert recess being positioned to form a circular recess with the corresponding recess on another insert when one of said inserts is placed on top of the other insert, and each insert being sized and configured to be received in the recess of a clamping mechanism section;
   a facing mechanism; and
   a heating mechanism.

2. The pipe fusion machine of claim 1, wherein at least two of the semicircular recesses within each insert have different diameters.

3. The pipe fusion machine of claim 1, further comprising an engagement mechanism adapted to move the clamping mechanisms.

4. The pipe fusion machine of claim 1, wherein the facing mechanism comprises a plurality of cutting heads.

5. The pipe fusion machine of claim 1, wherein at least one circular recess formed when one section of a clamping mechanism and insert is placed on top of the other section and insert, has a diameter smaller than the normal diameter of the pipe section.

6. The pipe fusion machine of claim 1, wherein the insert is removable from the clamping mechanism section.

7. A pipe fusion machine for fusing a first plurality of pipe sections to a second plurality of pipe sections, said machine comprising:
- a self-propelled frame;
- a plurality of clamping mechanisms, each mechanism comprising two sections, wherein each said section comprises one recess for receiving an insert, with at least one section of each clamping mechanism is supported by said self-propelled frame;
- a plurality of semi-circular, removable inserts, wherein at least two inserts have a plurality of semi-circular recesses, and at least two inserts have a single, semi-circular recess,
- each insert recess being positioned to form a circular recess with the corresponding recess on a matching insert, when one of said inserts is placed on top of the other insert, and
- each insert being sized and configured to be received in the recess of a clamping mechanism section;
- a facing mechanism; and
- a heating mechanism.

\* \* \* \* \*